United States Patent
Satoh

(10) Patent No.: US 7,647,532 B2
(45) Date of Patent: Jan. 12, 2010

(54) TRACE CONTROLLER, MICROPROCESSOR, AND TRACE CONTROL METHOD

(75) Inventor: Shuji Satoh, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 414 days.

(21) Appl. No.: 11/240,766

(22) Filed: Oct. 3, 2005

(65) Prior Publication Data

US 2006/0085688 A1    Apr. 20, 2006

(30) Foreign Application Priority Data

Oct. 4, 2004    (JP) .............................. 2004-291078

(51) Int. Cl.
  *G06F 11/00*    (2006.01)
(52) U.S. Cl. ........................................ 714/45; 712/227
(58) Field of Classification Search .................... 714/45
  See application file for complete search history.

(56) References Cited

U.S. PATENT DOCUMENTS

| | | | | |
|---|---|---|---|---|
| 6,023,561 A * | 2/2000 | Mann | ............................ | 714/45 |
| 6,530,076 B1 * | 3/2003 | Ryan et al. | ................... | 717/128 |
| 6,539,500 B1 * | 3/2003 | Kahle et al. | .................... | 714/45 |
| 6,834,365 B2 * | 12/2004 | Bardsley et al. | ................ | 714/45 |
| 6,859,891 B2 * | 2/2005 | Edwards et al. | ................ | 714/30 |
| 7,093,236 B2 * | 8/2006 | Swaine et al. | ................. | 717/128 |
| 7,318,017 B2 * | 1/2008 | Swoboda | ...................... | 703/28 |
| 2003/0033511 A1 * | 2/2003 | Akkary et al. | ................... | 712/235 |
| 2004/0030962 A1 * | 2/2004 | Swaine et al. | ................... | 714/45 |
| 2007/0180333 A1 * | 8/2007 | Thekkath et al. | ............... | 714/45 |

FOREIGN PATENT DOCUMENTS

| | | |
|---|---|---|
| JP | 06-161818 | 6/1994 |
| JP | 10-240570 | 9/1998 |
| JP | 2000-020345 | 1/2000 |

* cited by examiner

*Primary Examiner*—Yolanda L Wilson
(74) *Attorney, Agent, or Firm*—McGinn IP Law Group, PLLC

(57) ABSTRACT

A trace controller receives data access information during load instruction execution and ID (AID) of a load/store buffer to store the data access information during load instruction execution. Then, it generates trace control information TC based on the received data access information and selects a buffer to store the generated trace control information from a plurality of trace control buffers according to the received AID. After that, it receives read data information after load instruction execution and ID (RID) of a load/store buffer used for load instruction execution. Finally, it selects a buffer storing the trace control information TC from the plurality of trace control buffers according to the RID.

16 Claims, 4 Drawing Sheets

TRACE CONTROLLER, MICROPROCESSOR, AND TRACE CONTROL METHOD

BACKGROUND OF THE INVENTION

1. Field of the Invention

The present invention relates to a trace controller for tracing on a microprocessor.

2. Description of Related Art

Means to debug a microprocessor involve external tracing on instruction execution state and data access state of the microprocessor. When tracing, a trace controller that is connected to a microprocessor collects data such as program counter (PC) values output from the microprocessor and memory addresses accessed by the microprocessor. Such a trace control method is disclosed in Japanese Unexamined Patent Publication No. 2000-20345, 10-240570 and 6-161818, for example.

On the other hand, means to improve an instruction execution speed of a microprocessor involve pipelining. The pipelining technique executes in parallel stages in a microprocessor, such as instruction fetch (IF), instruction decode (ID), memory access (MEM), and write back (WB), thereby improving a processing speed of the microprocessor. This technique is used in many microprocessors. Further, means to further improve an instruction execution speed of a microprocessor using pipelining involve non-blocking access and reordering access.

The non-blocking access is an operation that, if no dependencies exist between a plurality of load/store instructions to be executed, executes the next instruction without waiting for memory access for the previously executed instruction to be completed. The reordering access is an operation that completes data access cycles regardless of an instruction execution order if no dependencies exist between load/store instructions. For example, if there are a plurality of memory blocks having different memory access speeds, a control bus, address bus and data bus between a microprocessor and each memory block, which are referred to herein collectively as the memory bus, exist independently from each other, thus allowing independent issue of a data access cycle to each memory block. It is therefore possible to issue a data access cycle to a memory block without waiting for a data access cycle for another memory block to be completed.

In a microprocessor that implements the non-blocking access and the reordering access, an order to execute instructions (order to issue data access cycles) and an order to complete data access cycles are not the same in some cases due to a difference in memory access speed. For example, when using two memory blocks with different memory access speeds (high-speed memory and low-speed memory), if the issue of a data access cycle for the low-speed memory precedes the issue of a data access cycle for the high-speed memory, the data access cycle for the high-speed memory can complete earlier than the data access cycle for the low-speed memory in some cases.

A trace operation during execution of load/store instructions in a conventional microprocessor 30 that implements non-blocking access and reordering access and a conventional trace controller 35 is described hereinafter with reference to FIGS. 3 and 4. FIG. 3 shows the configuration of the microprocessor 30 and the trace controller 35.

The configuration of the microprocessor 30 is described first. An execution control section 301 is a circuit that controls the execution of instructions. When a load instruction is executed, the execution control section 301 supplies an execution program counter value (PC), access address (A), R/W information (RW) and access size (S) and, additionally, write data information (WD) in the execution of a store instruction. These pieces of information are collectively referred to herein as the data access information. The data access information is also supplied to an output terminal group 309. The data access information supplied to the output terminal group 309 is collected as trace data by a trace controller 35 and also used as index information to make an association with write-back information that is output from an output terminal group 310, which is described later.

A memory access control section 302 is a circuit that makes data access to high-speed memory 306 and low-speed memory 307. The data access information is supplied from the execution control section 301 to an input selection section 303. The input selection section 303 selects a buffer to store the received data access information from a plurality of buffers, which are four buffers A to D in FIG. 3, in a load/store buffer 304. The load/store buffer 304 includes a plurality of buffers, four buffers A to D in FIG. 3, and stores data access information to the high-speed memory 306 or the low-speed memory 307 and also stores read data (RD) read out from the high-speed memory 306 or the low-speed memory 307 after executing the load instruction.

An output selection section 305 selects the read data RD to be supplied to a write-back control section 308 from the plurality of buffers in the load/store buffer 304. Further, the output selection section 305 supplies the selected read data RD and a PC value (RPC), access address (RA), R/W information (RRW) and read data size (RS), which are data access information corresponding to the selected read data RD, to the output terminal group 310. The pieces of information supplied to the output terminal group 310 are collectively referred to herein as the write-back information.

The write-back control section 308 stores the read data supplied from the memory access control section 302 into a register file, not shown, in the microprocessor 30.

If an instruction to be executed in succession to a load/store instruction is not dependent on the result of the load/store instruction, the microprocessor 30 starts executing the next instruction without waiting for the execution of the load/store instruction to be completed (the non-blocking access). Further, when the data access information is stored in more than one of the buffers A to D in the load/store buffer 304, if no data access cycle is issued to a memory bus of the memory to be accessed and no dependencies exist between the load/store instructions given by the plurality of pieces of data access information, the microprocessor 30 issues data access cycles to a plurality of memory buses in parallel (the reordering access). Therefore, there are cases where the data access cycles are completed in a different order from an instruction execution order.

The configuration of the trace controller 35 is described next. A data access information detection section 351 receives the data access information output from the output terminal group 309 of the microprocessor 30 through an input terminal group 357. The data access information detection section 351 generates and outputs trace information 360 from the received data access information containing PC, A, RW and S, and, additionally, WD in the case of a store instruction. Further, the data access information detection section 351 generates trace control information (TC) and, if the received data access information relates to a load instruction, supplies the generated trace control information TC to an input selection section 352.

The trace control information TC is information that indicates whether to trace the instruction executed in the microprocessor 30, ie, whether to supply the data access information and write-back information detected by the trace controller 35 to an external analysis unit. The trace controller 35 stores the trace control information TC in a trace control buffer 353 and associates the write-back information output after completion of a read data cycle in the microprocessor 30 with the trace control information stored in the trace control buffer 353, thereby determining whether to output the write-back information.

The input selection section 352 receives the trace control information TC and the data access information (PC, A, RW and S) and supplies them to one of a plurality of buffers, which are buffers A to D in FIG. 3, in the trace control buffer 353. In the selection of the buffer to store the information, the input selection section 352 selects the buffer where the trace control information TC is already selected and output by the output selection section 355.

The trace control buffer 353 includes a plurality of buffers, which are the buffers A to D in FIG. 3, and stores the trace control information TC and the data access information supplied from the input selection section 352. The data access information is stored together with the trace control information TC so that a comparison/output control section 354, which is described later, uses the data access information as index information for associating the trace control information TC with the read data information.

The comparison/output control section 354 receives the write-back information (RPC, RA, RRW and RS) that is output from the output terminal group 310 of the microprocessor 30 through an input terminal group 358. The comparison/output control section 354 then compares the received write-back information with the data access information that is stored in the trace control buffer 353 and selects the buffer that stores the data access information corresponding to the write-back information. Further, the comparison/output control section 354 gives an instruction to an output selection section 355 so as to select the trace control information TC that is stored in the selected buffer as the one corresponding to the write-back information.

The output selection section 355 selects the trace control information TC that is stored in the buffer specified by the comparison/output control section 354 and supplies it to a write-back information detection section 356. The write-back information detection section 356 receives write-back information from the microprocessor 30 through the input terminal group 358 and then generates and outputs trace information 361 from the received write-back information (RPC, RA, RRW, RS and RD). The write-back information detection section 356 determines whether to supply the trace information 361 to an external analysis unit or the like according to what is indicated by the trace control information TC.

As described in the foregoing, the trace controller 35 to perform tracing on the microprocessor 30 that implements the non-blocking access and the reordering access use the data access information (PC, A, RW, S) and write-back information (RPC, RA, RRW, RS) as the index information for associating the trace control information TC and the read data RD. The operation for associating the trace control information TC with the read data RD is described hereinafter in detail with reference to FIG. 4.

FIG. 4 shows a case where the microprocessor 30 starts executing a load instruction 1 (LOAD 1), a load instruction 2 (LOAD 2), a load instruction 3 (LOAD 3) and a load instruction 4 (LOAD 4) sequentially. When each load instruction is executed in EX stage, the trace controller 35 receives the data access information and then generates and outputs the trace information 360. The trace control buffers 353A to 353D in FIG. 4 indicate the buffers A to D that are included in the trace control buffer 353. The buffers 353A to 353D respectively store the trace control information TC1 to TC4 that is generated in the data access information detection section 351 and the data access information that is used as index information. FIG. 4 shows a case where the load instructions 1 and 2 are objects of tracing while the load instructions 3 and 4 are excluded from of tracing. Therefore, the trace control information TC1 and TC2 corresponding to the load instructions 1 and 2 is "ON" and the trace control information TC3 and TC4 corresponding to the load instructions 3 and 4 is "OFF".

Since the microprocessor 30 implements the reordering access, the order to start executing the load instructions 1 to 4 and the order to complete the data access cycles in MEM stage do not always the same. The ends 1 to 4 in FIG. 4 respectively indicate the timing to complete the data access cycles for the load instructions 1 to 4, which is the timing to complete the MEM stage. FIG. 4 shows a case where the data access cycles are completed in the order of the load instructions 1, 3, 4, and 2.

The trace controller 35 associates the write-back information 41 to 44 that is output from the microprocessor 30 in the order of completing the data access cycles with the trace control information TC1 to TC4. First, when the data access cycle for the load instruction 1 is completed, the trace controller 35 receives the write-back information 41 from the microprocessor 30. The comparison/output control section 354 compares the received write-back information 41 with the data access information stored in the buffers 353A to 353D and selects the buffer 353A that stores the data access information for the load instruction 1 corresponding to the write-back information 41. The write-back information detection section 356 determines whether to output the trace information 361 according to the trace control information TC1 that is stored in the selected buffer 353A. The comparison/output control section 354 further makes comparison on the write-back information 42 to 44 in the same manner and determines whether to output the trace information 361 according to the associated trace control information TC.

As described above, the trace method that uses execution PC, access address, R/W information, read data size and so on as index information in the tracing of the load instruction requires storing index information in addition to trace control information, which increases the capacity of the trace control buffer to store the information.

SUMMARY OF THE INVENTION

As described in the foregoing, it has now been discovered that a conventional trace controller connected to a microprocessor that implements non-blocking access and reordering access needs to store lots of information such as execution PC, access address, R/W information and read data size as index information in the tracing of load instructions.

According to an aspect of the invention, there is provided a trace controller for tracing on a microprocessor, wherein the trace controller associates trace information during instruction execution with trace information after instruction execution according to identification information identifying one of a plurality of load buffers used for execution of a load instruction in the microprocessor.

The trace controller of this invention can associate trace control information that is trace information during instruction execution with read data information that is trace information after instruction execution according to identification information for identifying a load/store buffer that is supplied from the microprocessor. This eliminates the need for storing redundant data access information used as index information by a conventional trace controller in a trace control buffer.

The present invention eliminates the need for storing lots of information such as execution PC, access address, R/W information and read data size as index information when tracing load instructions to be executed in a microprocessor that implements non-blocking access and reordering access.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
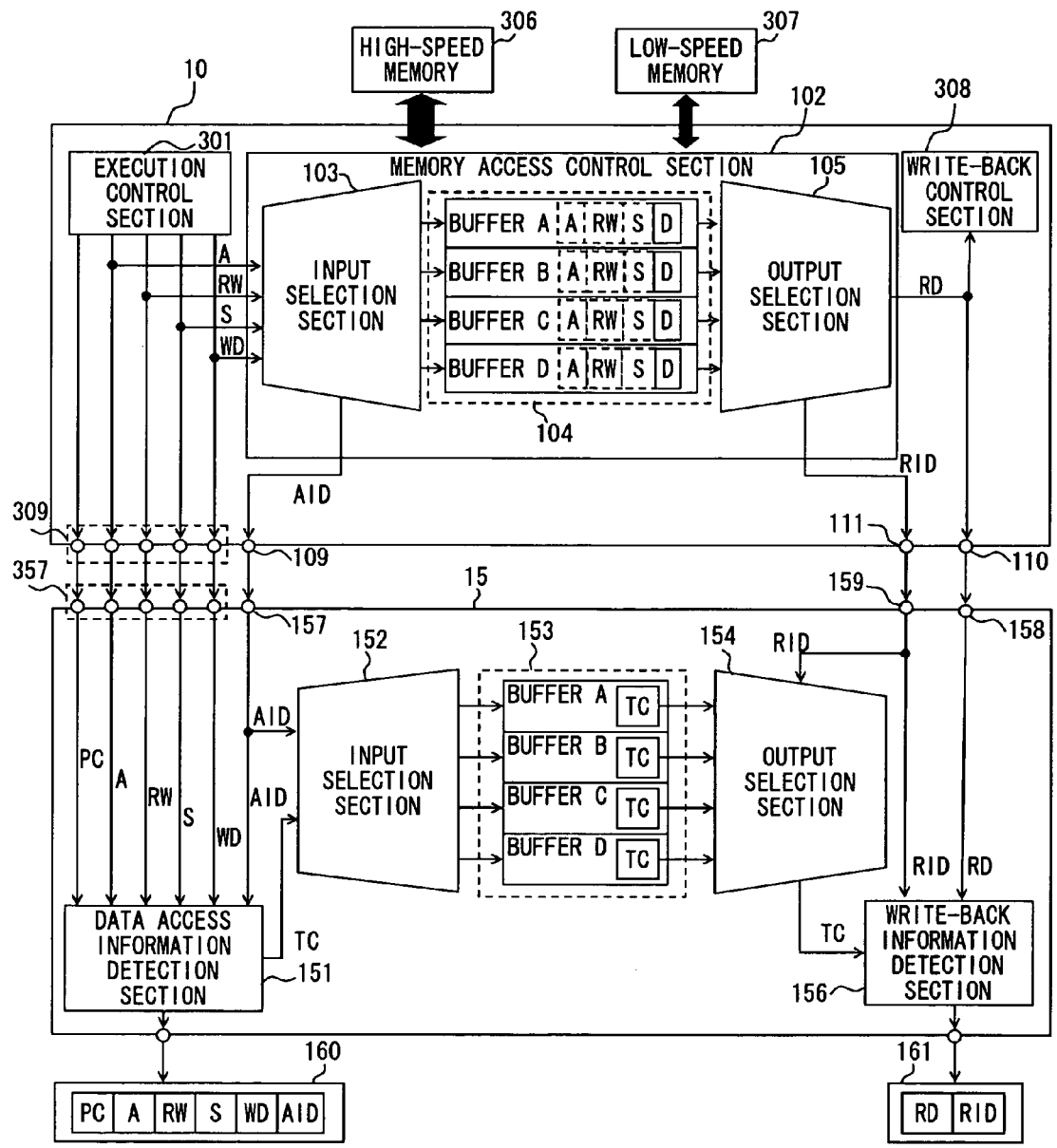
FIG. 1 is a block diagram of a microprocessor and trace controller according to the present invention.

FIG. 1 shows the configuration of a microprocessor 10 and a trace controller 15 according to a first embodiment of the invention. The microprocessor 10 implements non-blocking access and reordering access. It has output terminals 109 and 111 that output load/store buffer ID to identify each buffer in a load/store buffer 104. The microprocessor 10 outputs the load/store buffer ID of a buffer that stores data access information together with the data access information during execution of load/store instructions. Further, in the execution of a load instruction, the microprocessor 10 outputs the load/store buffer ID of a buffer used for data access together with read data information after completion of a data access cycle. In the trace controller 15, on the other hand, the load/store buffer ID supplied from the microprocessor 10 and each buffer in a trace control buffer 153 correspond one-to-one.

Figure 3:
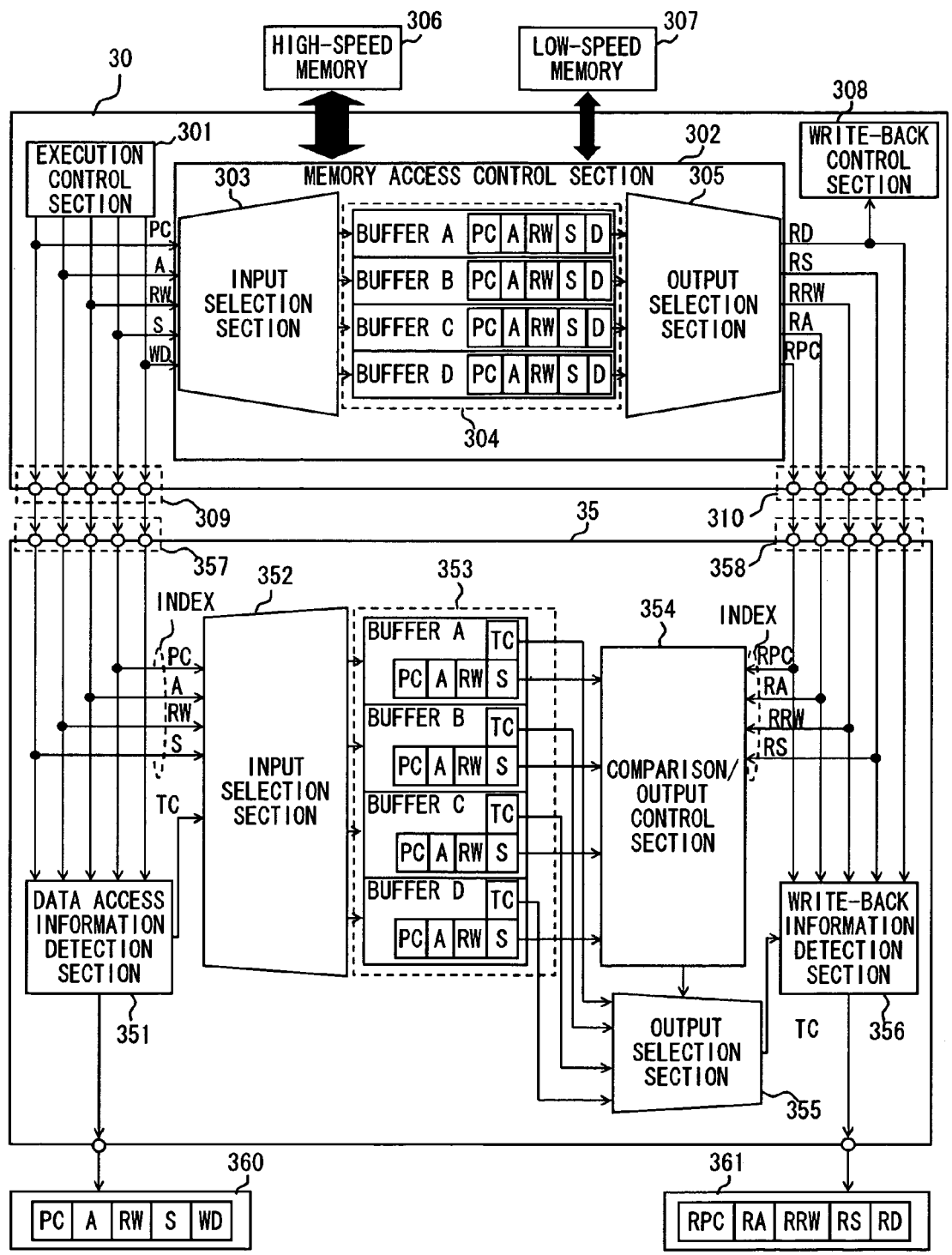
FIG. 3 is a block diagram of a conventional microprocessor and trace controller.
Figure 4:
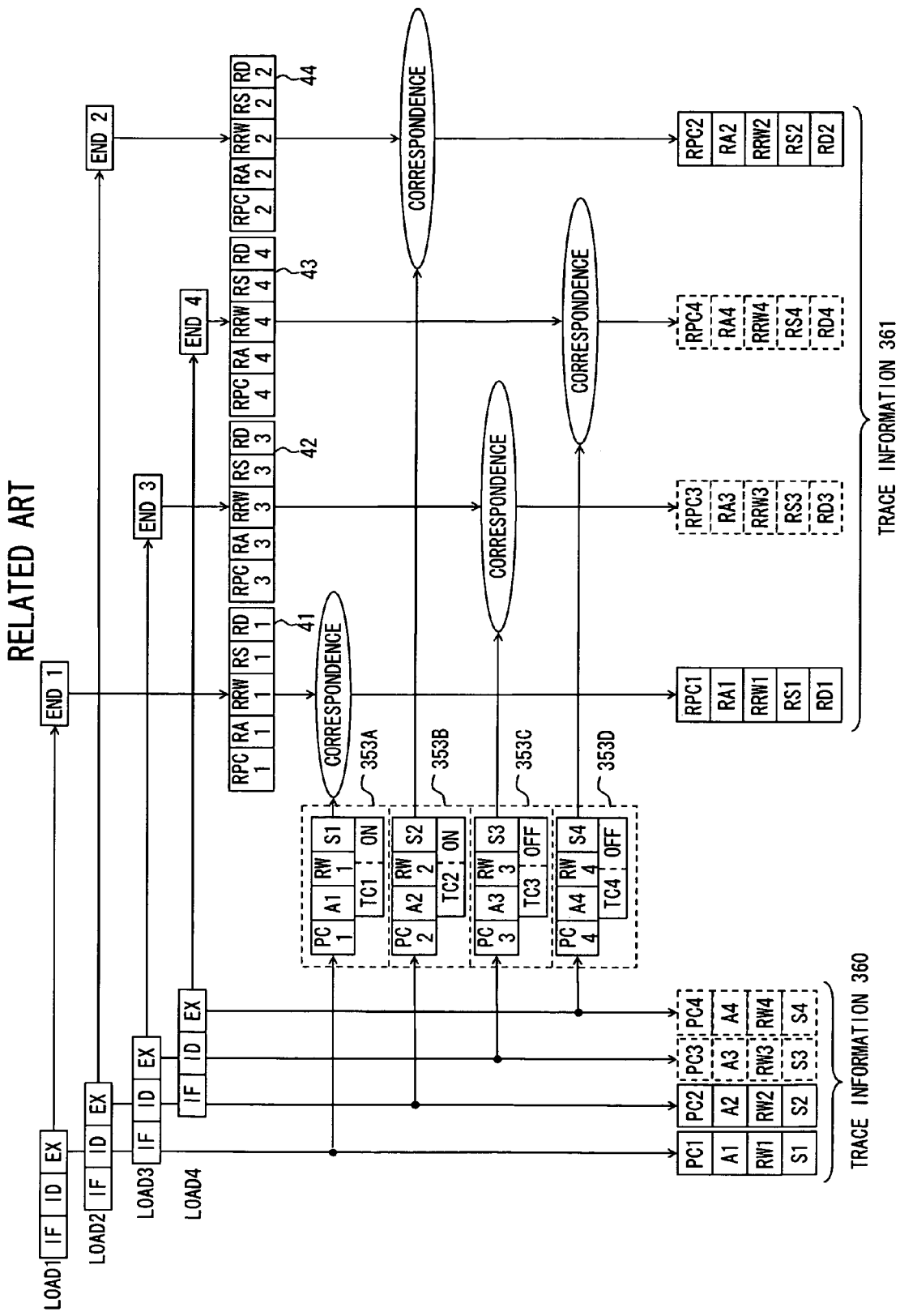
FIG. 4 is a view to describe a conventional operation to associate trace control information TC and read data RD.

The configuration of the microprocessor 10 is described first. The execution control section 301, the high-speed memory 306, the low-speed memory 307, the write-back control section 308 and the output terminal group 309 that operate in the same way as those in the conventional microprocessor 30 are denoted by the same reference numerals as in FIG. 3 and not described in detailed herein. A memory access control section 102 makes data access to the high-speed memory 306 and the low-speed memory 307. The execution control section 301 supplies to an input selection section 103 an access address (A), R/W information (RW) and data size (S), and, additionally, write data (WD) in the case of a store instruction. Though the conventional microprocessor 30 supplies the PC value to the input selection section 303, the microprocessor 10 of this embodiment does not use the PC value as index information and therefore does not need to store the PC value in the memory access control section 102.

The input selection section 103 selects a buffer to store the received data access information from a plurality of buffers in a load/store buffer 104, which are four buffers A to D in FIG. 1. The input selection section 103 then supplies a load/store buffer ID (AID) of the selected buffer to an output terminal 109.

The load/store buffer 104 includes a plurality of buffers, which are four buffers A to D in FIG. 1, to store data access information for the high-speed memory 306 or the low-speed memory 307 and also store read data (RD) read out from the high-speed memory 306 or the low-speed memory 307 after executing the load instruction.

An output selection section 105 selects a buffer that stores the read data RD to be supplied to the write-back control section 308 from the plurality of buffers in the load/store buffer 104 and supplies the selected read data RD to the write-back control section 308 and an output terminal 110. Further, the output selection section 105 supplies a load/store buffer ID (RID) of the buffer that has stored the read data RD supplied to the write-back control section 308 to an output terminal 111.

The configuration of the trace controller 15 is described next. A data access information detection section 151 receives the data access information output from the output terminal group 309 and the AID output from the output terminal 109 of the microprocessor 10 through the input terminal group 357 and an input terminal 157, respectively. The data access information detection section 151 generates and outputs trace information 160 from the received AID and data access information containing PC, A, RW and S, and, additionally, WD in the case of a store instruction. Further, the data access information detection section 151 generates trace control information (TC) and, if the received data access information relates to a load instruction, supplies the generated trace control information TC to an input selection section 152.

The input selection section 152 receives the trace control information TC and AID and then supplies the received trace control information TC to one of a plurality of buffers, which are buffers A to D in FIG. 1, in the trace control buffer 153. The trace control buffer 153 includes at least the same number of buffers as the buffers included in the load/store buffer 104, and the trace control information TC is stored in the buffer corresponding one to one with the received AID. For example, the buffers A to D in the load/store buffer 104 respectively correspond to the buffers A to D in the trace control buffer 153, and if the received AID indicates the buffer A of the load/store buffer 104, the trace control information TC is stored in the buffer A of the trace control buffer 153.

An output selection section 154 receives the RID output from the output terminal 111 of the microprocessor 10 through an input terminal 159. Further, the output selection section 154 uniquely selects the buffer corresponding to the received RID from the buffers in the trace control buffer 153. In the above example, if the received RID indicates the buffer A of the load/store buffer 104, the output selection section 154 selects the buffer A of the trace control buffer 153. The output selection section 154 supplies the trace control information TC that is stored in the selected buffer to the write-back information detection section 156.

The write-back information detection section 156 receives the read data information RD and the load/store buffer ID (RID) from the microprocessor 10 through the input terminals 110 and 111, respectively. It then generates and outputs trace information 161 from the received RD and RID. Further, the write-back information detection section 156 determines whether to output the trace information 161 to an external analysis unit or the like according to what is indicated by the trace control information TC.

As described above, the trace controller 15 of this embodiment associates the trace control information TC with the read data information RD by using the load/store buffer ID. This eliminates the need for using data access information (PC, A, RW, S) and write-back information (RPC, RA, RRW, RS) as index information.

Further, the trace controller 15 of this embodiment can uniquely select the trace control buffer that stores the trace control information TC associated with the read data information RD by using the value of RID supplied together with the read data information. This eliminates the need for not only the process of selecting the oldest one from the index information having the same value but also the whole process of comparing with the data stored in the trace control buffer. It is thereby possible to further simplify the process of associating the trace control information TC with the read data information RD.

Specifically, the conventional trace control method has the following problems. When a microprocessor executes a loop operation, it can execute load instructions repeatedly on the same address due to the instructions of the same PC value. In this case, the same data access information is made for a plurality of load instructions. Therefore, the conventional trace controller cannot associate trace control information with read data information only by the correspondence between the write-back information that is output from the microprocessor after executing the load instruction and the data access information that is stored as index information in the trace control buffer. Thus, it requires a process of selecting the oldest one from a plurality of pieces of data access information having the same value. For example, it is necessary to perform comparison of data such as a sequence number indicating the order of storing into the trace control buffer and time stamp information indicating a stored time.

However the same buffer in the load/store buffer 104 is no used for the execution of a plurality of load instructions until the data access cycle is completed in the microprocessor 10. Therefore, until the read data information is supplied from the microprocessor 10 to the trace controller 15 after completion of the data access cycle, the buffers A to D of the load/store buffer 104 are used exclusively for the execution of a single load instruction. The trace controller 15 of this embodiment can thereby uniquely associate trace control information TC with read data information RD according to a load/store buffer ID as identification information of the load/store buffer. It is therefore possible to associate the trace control information TC with write-back information without performing a process equivalent to the process of selecting the oldest one from data access information having the same value, which has been required in the conventional trace controller.

Further, the conventional trace controller 35 has index information such as PC value and access address contained in the trace information 361 that is generated from the write-back information in order to enable association with the trace information 360 that is generated from the data access information. The trace controller 15 of this embodiment, on the other hand, can make an association between the trace information by using AID and RID, thereby allowing reduction of the size of the trace information 161.

Second Embodiment

Figure 2:
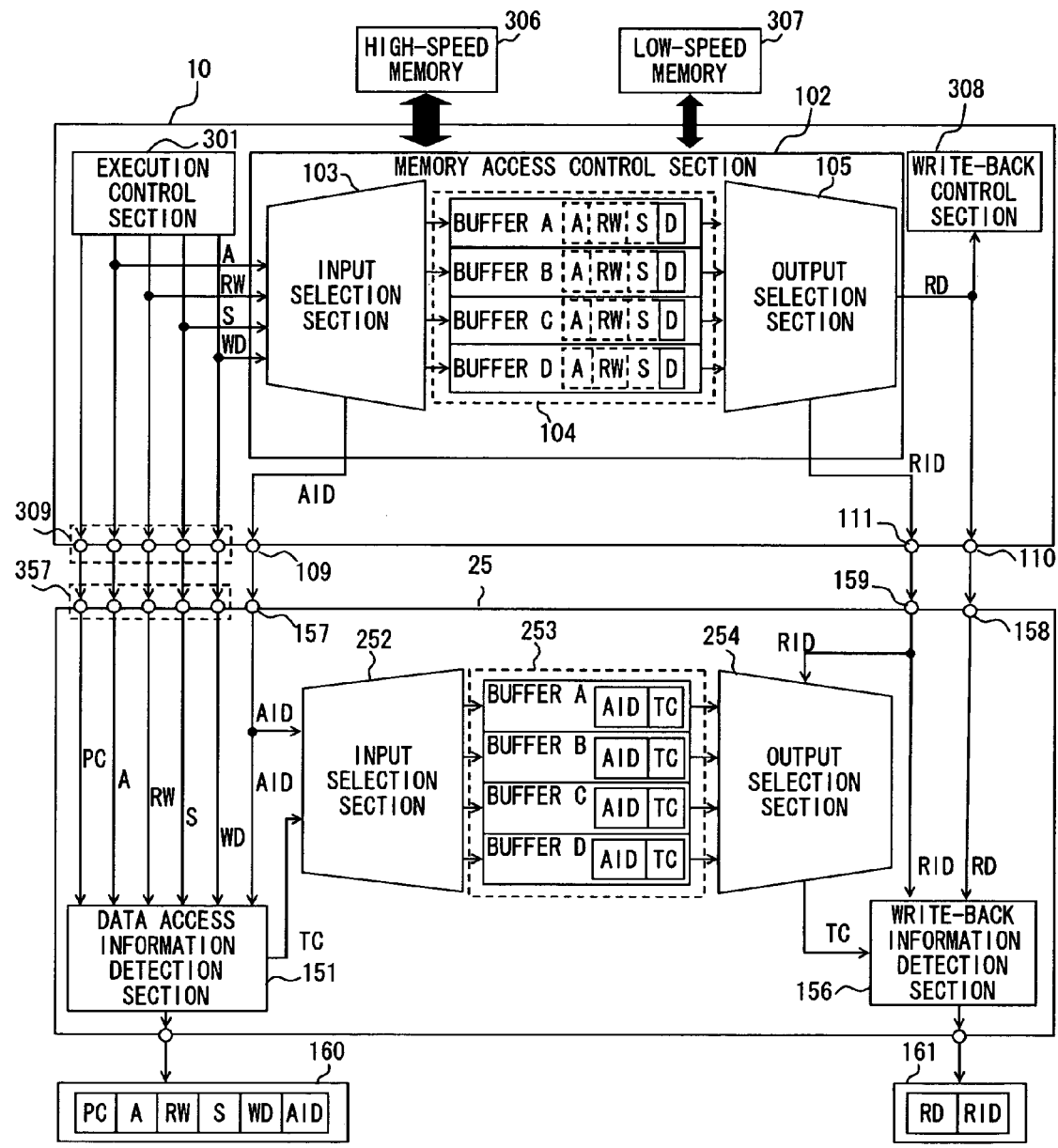
FIG. 2 is a block diagram of a microprocessor and trace controller according to the present invention.

FIG. 2 shows the configuration of a microprocessor and a trace controller according to a second embodiment of the invention. The microprocessor of this embodiment is the same as the microprocessor 10 described in the first embodiment and thus not described herein. In this embodiment, a trace controller 25 stores load/store buffer ID (AID) in a trace control buffer 253. An input selection section 252 stores received AID and trace control information TC into an unused buffer of the buffers included in the trace control buffer 253. An output selection section 254 selects the trace control information that is stored together with the AID corresponding to received RID and outputs it to the write-back information detection section 156. The other components and operation are the same as in the first embodiment.

This configuration also enables to make an association between trace control information TC and read data information RD without the need for redundant index information which has been used in the conventional trace controller 35. Further, since each buffer in the load/store buffer 104 is used exclusively until a data access cycle is completed and read data is supplied to the write-back control section 308 and the trace controller 25, in no case the same AID is stored at the same time in a plurality of buffers in the trace control buffer 253. Therefore, it eliminates the need for selecting the oldest one from the index information having the same value, which has been conventionally required.

Though the first and second embodiments describe the case of associating the trace control information TC and the read data information RD, the present invention is not limited thereto, and it is feasible to associate other trace information during and after load instruction execution according to the load/store buffer ID.

It is apparent that the present invention is not limited to the above embodiment that may be modified and changed without departing from the scope and spirit of the invention.

What is claimed is:

1. A trace controller for tracing on a microprocessor, wherein the trace controller associates trace information during instruction execution with trace information after instruction execution according to identification information identifying one of a plurality of load buffers used for execution of a load instruction in the microprocessor, and wherein the trace controller comprises:

a data access information detection section receiving data access information during load instruction execution in the microprocessor and first identification information identifying one of the plurality of load buffers to store the data access information during load instruction execution from the microprocessor and generating trace control information based on the received data access information;

a plurality of control information buffers storing the trace control information;

an input selection section selecting a control information buffer to store the trace control information from the plurality of control information buffers according to the first identification information; and a control section receiving read data information after load instruction execution in the microprocessor and second identification information identifying one of the plurality of load buffers used for load instruction execution from the microprocessor and selecting a control information buffer storing the trace control information from the plurality of control information buffers according to the second identification information.

2. The trace controller according to claim 1, wherein the plurality of load buffers and the plurality of control information buffers correspond one to one, and the input selection section uniquely selects one from the plurality of control information buffers according to the first identification information.

3. The trace controller according to claim 2, wherein the trace control information and the read data information are associated by selecting a control information buffer corresponding one to one with the load buffer identified by the second identification information.

4. The trace controller according to claim 1, wherein the data access information and the first identification information are output in association with each other, and the read data information and the second identification information are output in association with each other.

5. The trace controller according to claim 1, further comprising an input selection section selecting a control information buffer to store the trace control information from a plurality of control information buffers according to first identification information.

6. The trace controller according to claim 1, further comprising a control section receiving read data information after load instruction execution in the microprocessor and second identification information identifying one of the plurality of load buffers used for load instruction execution from the microprocessor and selecting a control information buffer storing the trace control information from the plurality of control information buffers according to the second identification information.

7. The trace controller according to claim 1, further comprising a data access information detection section receiving data access information during load instruction execution in the microprocessor and first identification information identifying one of the plurality of load buffers to store the data access information during load instruction execution from the microprocessor and generating trace control information based on the received data access information.

8. The trace controller according to claim 1, further comprising an output selection section configured to select a buffer to store read data and to supply a load/store buffer ID of a buffer that stores the read data supplied to a write back control section.

9. The trace controller according to claim 8, wherein the input selection section supplies a load/store buffer ID of a selected buffer to an output terminal.

10. The trace controller according to claim 9, wherein the trace controller associates the trace information by using the load/store buffer ID of the buffer that stores the read data and the load/store buffer of the selected buffer to an output terminal.

11. The trace controller according to claim 1, wherein the input selection section is configured to select a buffer to store received data access information from the plurality of buffers.

12. A microprocessor comprising:
a plurality of load buffers storing data access information necessary for executing a load instruction;
a data access information detection section receiving data access information during load instruction execution in the microprocessor and first identification information from the microprocessor and generating trace control information based on the received data access information;
a plurality of control information buffers storing the trace control information;
an input selection section selecting a control information buffer to store the trace control information from the plurality of control information buffers according to the first identification information; and
a control section receiving read data information after load instruction execution in the microprocessor and second identification information from the microprocessor and selecting a control information buffer storing the trace control information from the plurality of control information buffers according to the second identification information,
wherein the first identification information identifying one of the plurality of load buffers storing the data access information is output during load instruction execution, and the second identification information identifying one of the plurality of load buffers used for data access is output after load instruction execution.

13. The microprocessor according to claim 12, wherein the data access information and the first identification information are output in association with each other, and the read data information and the second identification information are output in association with each other.

14. A trace control method to collect data output from a microprocessor, said method comprising:
receiving data access information during load instruction execution in the microprocessor and first identification information identifying one of a plurality of load buffers to store the data access information during load instruction execution from the microprocessor;
generating trace control information based on the received data access information; receiving read data information after load instruction execution in the microprocessor and second identification information identifying one of the plurality of load buffers used for load instruction execution from the microprocessor;
associating the trace control information with the read data information according to the first identification information and the second identification information;
storing the trace control information;
selecting a control information buffer to store the trace control information from the plurality of control information buffers according to the first identification information; and
receiving read data information after load instruction execution in the microprocessor and second identification information identifying one of the plurality of load buffers used for load instruction execution from the microprocessor and selecting a control information buffer storing the trace control information from the plurality of control information buffers according to the second identification information.

15. The trace control method according to claim 14, wherein the received data access information and the first identification information are output in association with each other, and the received read data information and the second identification information are output in association with each other.

16. The trace control method according to claim 14, wherein the generated trace control information is stored in a control information buffer uniquely corresponding to a load buffer included in the microprocessor, and the trace control information and the read data information are associated by associating the second identification information received from the microprocessor with the control information buffer.

* * * * *